W. R. GARDNER.
NUT LOCK.
APPLICATION FILED OCT. 25, 1909.

966,003.

Patented Aug. 2, 1910.

Witnesses:
Inventor:
William R. Gardner,

UNITED STATES PATENT OFFICE.

WILLIAM R. GARDNER, OF LOS ANGELES, CALIFORNIA, ASSIGNOR, BY DIRECT AND MESNE ASSIGNMENTS, TO GARDNER'S LOCK NUT COMPANY, OF LOS ANGELES, CALIFORNIA, A CORPORATION OF CALIFORNIA.

NUT-LOCK.

966,003.  Specification of Letters Patent.  Patented Aug. 2, 1910.

Application filed October 25, 1909. Serial No. 524,563.

*To all whom it may concern:*

Be it known that I, WILLIAM R. GARDNER, a citizen of the United States, residing at Los Angeles, in the county of Los Angeles and State of California, have invented a new and useful Nut-Lock, of which the following is a specification.

This invention relates to nut locks, and has for its object to produce a nut lock which will permit the nut to be readily turned up on the bolt, but which will prevent the nut from unscrewing on the bolt.

A further object is to provide a construction which is of extreme simplicity and which can not get out of order.

A further object is to provide a nut lock which is of extremely economical construction.

Other objects and advantages will be brought out in the following description.

Figure 1:
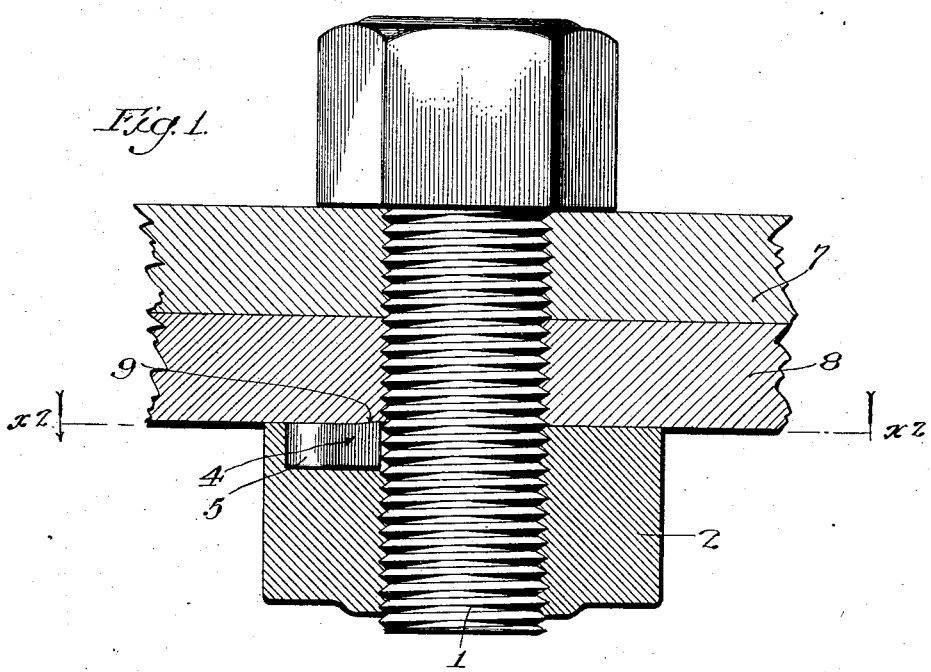
Figure 2:
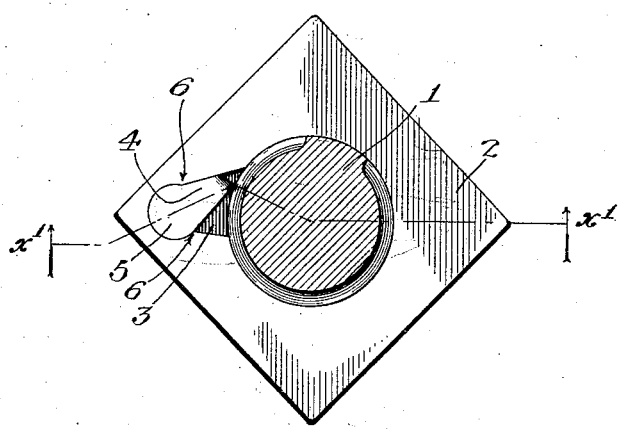
Figure 3:
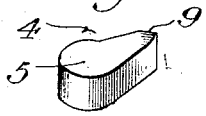

The accompanying drawings illustrate the invention, and referring thereto:—Figure 1 is a section on line $x^1$—$x^1$ Fig. 2, showing the nut lock as applied to a bolt holding two pieces together. Fig. 2 is a section on line $x^2$—$x^2$ Fig. 1. Fig. 3 is a perspective view of the dog.

1 designates the threaded bolt.

2 designates the nut having a recess 3 arranged tangentially and widening toward the point where it opens into the center of the nut. Within the recess 3 is a dog 4 having a hub 5 which is retained in the recess 3, the latter having shoulders 6. The recess 3 is formed on the inner side of the nut, that is, on the side of the nut which comes in contact with the shoulder against which the nut is screwed. For example, in Fig. 1, two pieces 7 and 8 are shown, the nut 2 bearing against the piece 8 and the recess 3 bearing against that side of the nut which bears against the piece 8. The length of the dog 4 is such that when the nut turns reversely, the edge of the dog will grip in the threads of the bolt 1 and thus act as a pawl or detent to prevent the nut from unscrewing. In order to insure that the edge of the dog will be caused to bite into the threads, one side of the dog is formed with a projection 9 which bears against the piece 8 so that when the nut 2 commences to unscrew the frictional contact between the projection 9 and the piece 8 retards the end of the dog 4 and causes its edge to bite into the threads of the bolt. This frictional engagement of the projection 9 is of vital importance in this invention. This frictional engagement, however, does not prevent the nut from being screwed onto the bolt because during such movement it has a reverse action on the pawl tending to throw it away from contact with the bolt.

What I claim is:—

1. A nut lock comprising a nut formed with a threaded opening, and a recess intercepting said opening, a pawl provided with an operating end and which is mounted in the recess and adapted to have a rocking motion therein, said pawl having a projection which extends beyond the face of the nut and adapted to engage the surface of the material against which said nut bears when in use, the said projection causing a frictional resistance between the pawl and the surface of the material against which the nut bears and thereby cause said pawl to rock in the recess and hold its operating end in frictional contact with the threads of a bolt in the opening in the nut when the latter is reversely turned.

2. A nut lock comprising a nut formed with a recess which is rounded at one end to form a bearing, a pawl having a hub at one end which fits in the bearing and an operating edge at the opposite end, the operating edge having a projection which contacts with the surface of the material against which the nut bears when turned on a screw, the said projection forming a frictional resistance between the surface of the material and the pawl thereby causing the latter to rock in its bearing and throwing the operating edge into contact with a screw and gripping the same when the nut is reversely turned.

3. A nut lock comprising a pawl provided with a projection which extends beyond the operating end thereof, means for mounting the pawl on the nut so that it may rock only when the nut is reversely turned on a bolt, the projection frictionally engaging the surface of the material against which the nut bears when in use and thereby causing the pawl to rock and grip the threads of a bolt when the nut is reversely turned.

4. A nut lock comprising a nut formed with a recess, a rocking pawl mounted in the recess and having a projection adjacent its operating end which extends beyond the face of the nut, the projection frictionally engaging the surface of the material with which the nut contacts when in use, and thereby causing the pawl to rock and the operating end to grip the periphery of the bolt when the nut is reversely turned on said bolt.

In testimony whereof, I have hereunto set my hand at Los Angeles, California, this 19th day of October, 1909.

WILLIAM R. GARDNER.

In presence of—
G. T. HACKLEY,
FRANK L. A. GRAHAM.